Figure 1:
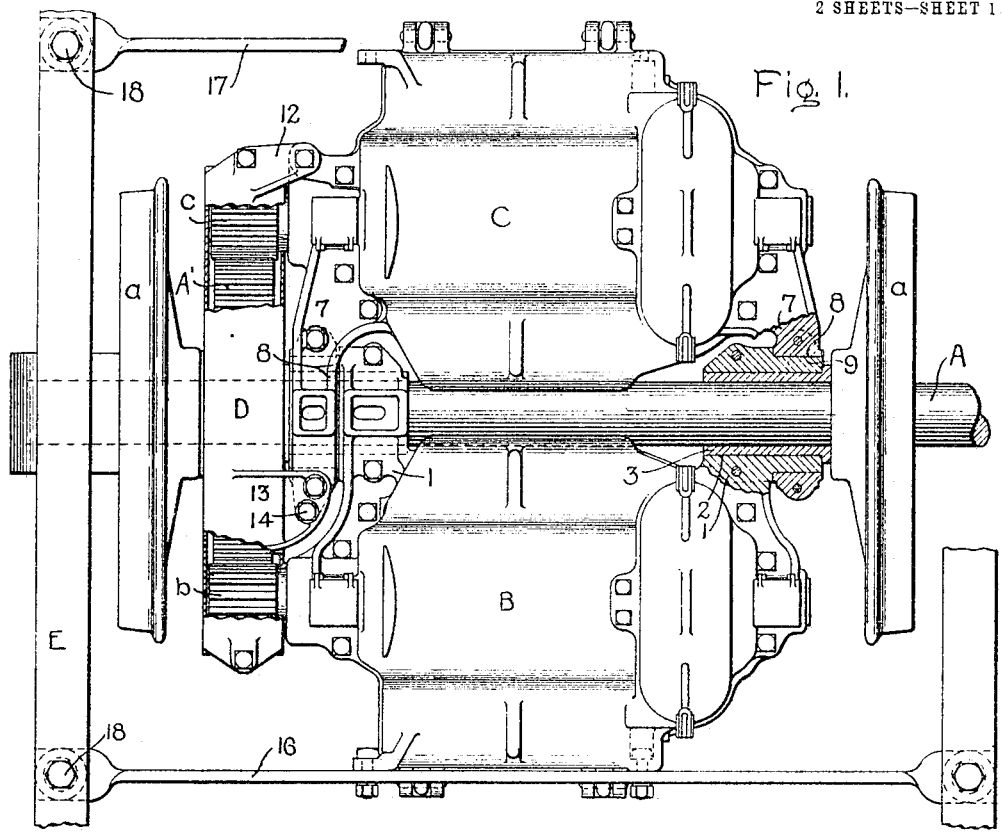

No. 799,264. PATENTED SEPT. 12, 1905.
E. D. PRIEST.
MOTOR SUSPENSION FOR ELECTRIC MOTORS.
APPLICATION FILED FEB. 11, 1905.

2 SHEETS—SHEET 1.

Witnesses.

Inventor:
Edward D. Priest.
by
Atty.

No. 799,264. PATENTED SEPT. 12, 1905.
E. D. PRIEST.
MOTOR SUSPENSION FOR ELECTRIC MOTORS.
APPLICATION FILED FEB. 11, 1905.
2 SHEETS—SHEET 2.
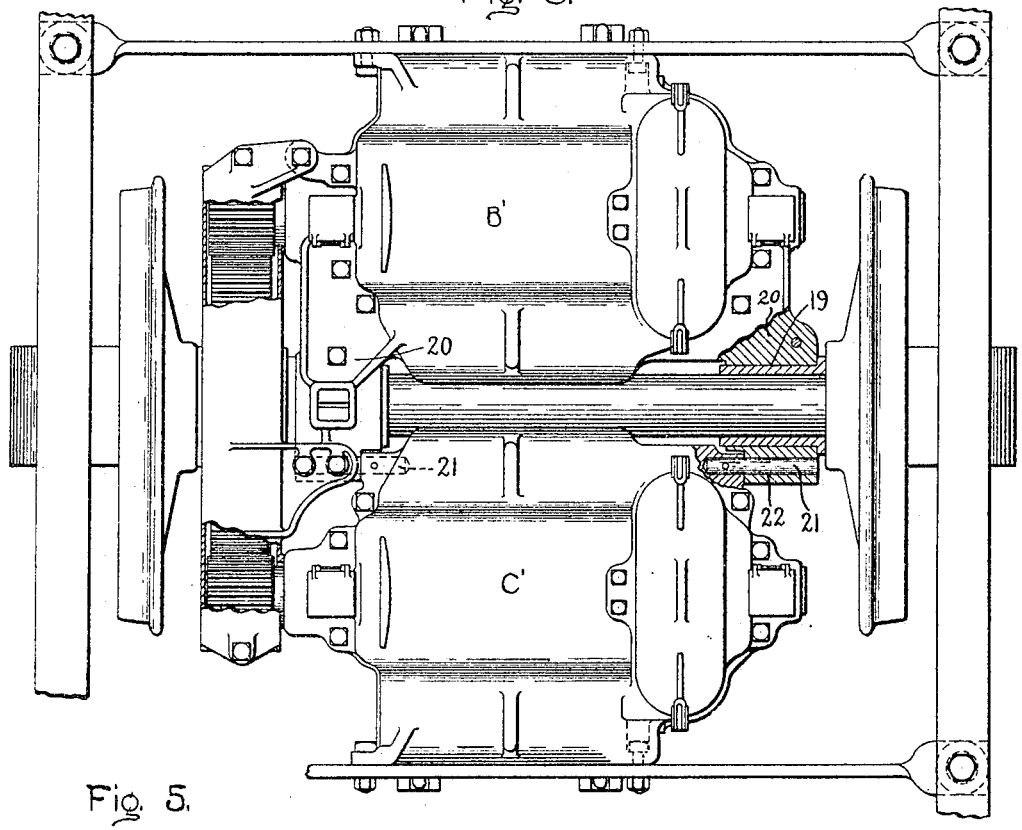
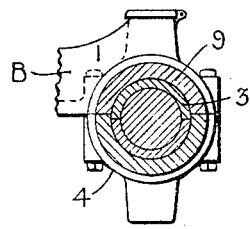
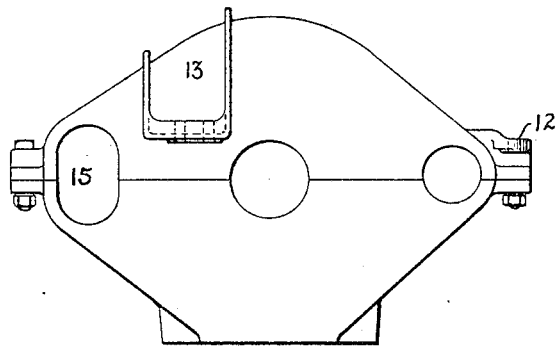
Witnesses,
Elnathan E. Briggs
Helen Oxford
Inventor:
Edward D. Priest.
by Albert G. Davis
Atty

UNITED STATES PATENT OFFICE.

EDWARD D. PRIEST, OF SCHENECTADY, NEW YORK, ASSIGNOR TO GENERAL ELECTRIC COMPANY, A CORPORATION OF NEW YORK.

MOTOR SUSPENSION FOR ELECTRIC MOTORS.

No. 799,264.      Specification of Letters Patent.      Patented Sept. 12, 1905.

Application filed February 11, 1905. Serial No. 245,263.

*To all whom it may concern:*

Be it known that I, EDWARD D. PRIEST, a citizen of the United States, residing at Schenectady, county of Schenectady, State of New York, have invented certain new and useful Improvements in Motor Suspension for Electric Vehicles, of which the following is a specification.

The present invention relates to electrically-operated vehicles, and particularly to an arrangement of driving-motors for such vehicles.

It is sometimes difficult to obtain enough power from a single motor of dimensions permitted by the space available for motors on electrically-propelled vehicles, and each of the driving-axles must therefore be provided with two motors. By connecting the two motors in series a high-line potential may be employed—namely, twice the usual potential. Where two motors are employed to drive the same axle, the construction is simplified by having a gear on the axle which meshes with the pinions of trains of gearing of both motors and by supporting the motors partially from the axle which they serve to drive. It is desirable, however, to have the motors so supported and arranged that each is free to move independently of the other motor within certain limits in order that each motor may at all times freely adjust itself as occasion may require.

The object of the present invention is to provide means for partially supporting a pair of motors upon a single driving-axle in such a manner that each motor may move as a unit within certain limits independently of the other.

A further object of the present invention is to associate a pair of motors with a driving-axle in such a manner that each motor may move independently of the other within defined limits, but will be maintained in operative relation to a common driven gear upon the axle.

A further object of the present invention consists in providing a simple and compact support for a pair of motors in operative relation to a common driving-axle.

To the above ends I locate two motors upon opposite sides of the driving-axle, hinge them together, and provide them with a common support upon the axle, one end of each motor being supported in the usual manner from the truck-frame or vehicle-frame. By this arrangement each motor is free to oscillate to some extent about the driving-axle independently of the other motor. Each motor is provided with a pinion secured to its armature or rotor-shaft, the two pinions in turn meshing with a gear-wheel carried by the driving-axle. Since it is customary to cover gear-trains with a protecting casing or shield, I have provided a casing inclosing the entire gear mechanism secured to the casing of one of the motors and movable with it.

The present invention is illustrated in two of its preferred forms in the accompanying drawings, in which—

Figure 2:
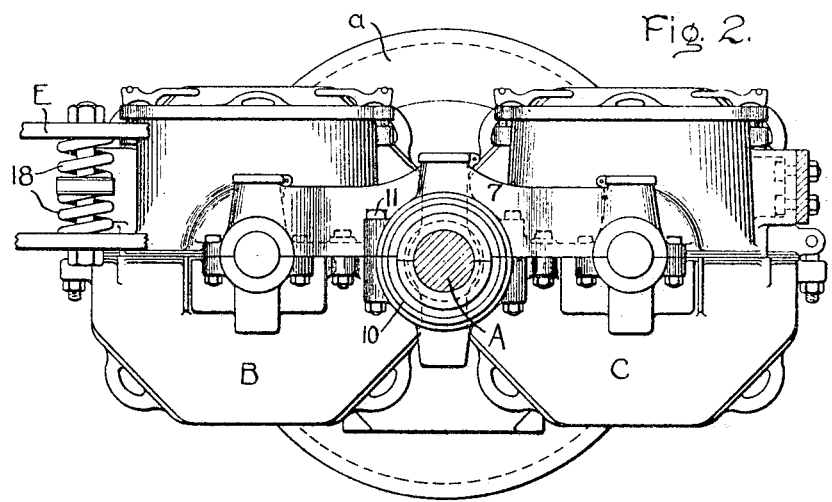

Figure 1 is a plan view of a pair of driving-wheels and axle having applied thereto the present invention. Fig. 2 is a side elevation of the parts shown in Fig. 1, one of the wheels, however, being removed for the sake of clearness. Fig. 3 is a view similar to Fig. 1 of a further modified form of the present invention. Fig. 4 is a side elevation of the gear-casing, and Fig. 5 shows a detail.

Similar reference characters will be used throughout the specification and drawings to indicate like parts.

Reference being had to Figs. 1 and 2, A represents a driving-axle of a car or locomotive, and *a a* are the driving-wheels.

B and C are two motors, which may be, except as hereinafter specified, of any suitable form or construction, since the present invention relates rather to the manner of supporting the motors than to the construction of the motors themselves. Motor B is provided with a pair of projecting arms 1 1, which are provided with cylindrical openings 2, parallel with the axis of the motor. These openings may be of substantially the same diameter as the diameter of the axle A, whereby upon positioning the axle within these openings a bearing is provided for one side of the motor; but I prefer to place a sleeve or bushing 3 within each of these openings in order that the wear due to the rotation of the axle may be borne by the sleeve. In the preferred construction only half of the cylindrical openings 2 is formed in each of the arms themselves, the other half being formed in detachable caps 4 4, which are bolted to the under side of the arms 1 1, as most clearly shown in Fig. 5. By removing the bolts 6 the caps 4 may be dropped and the motor lifted from the axle. The motor C is provided with two projecting arms 7 7, similar to the arms 1 1, but spaced at a greater distance apart. These arms are provided with bearings 8 8, which do not engage directly with the axle or with the sleeve 3, but fit cylindrical bosses 9 9, projecting laterally from the arms 1 1 or from the arms 1 1 and caps 4 4. Consequently the two motors have a common bearing upon the axle and are hinged together by means of the bearings 8 and bosses 9. The bearings 8 are preferably formed in two halves, one of which is located in cap-plates 10, bolted to the under side of the arms 7 by means of bolts 11, whereby upon removing the bolts 11 and the cap-plates 10 the motor C may be lifted out of position. The particular arrangement of supporting-arms described is not essential, since one of the motors may be supported upon the axle in any suitable manner.

The motors B and C are provided, respectively, with pinions $b$ $c$, which preferably mesh directly with a pinion A', secured to the driving-axle, since each motor is pivotally supported upon the axis about which the pinion A' rotates. Oscillations of the motors do not produce a disarrangement of the gear connections, since the pinions $b$ and $c$ simply travel about the periphery of the gear-wheel during such oscillations.

D is a casing inclosing the gearing and is preferably supported directly upon one of the motors. As illustrated, the casing is provided with a lug 12, which is bolted or otherwise secured to the casing of the motor C, and with a second lug 13, which is attached, by means of bolts 14 or other fastening means, to the end of the adjacent arm 7. The gear-casing is therefore rigidly secured to the motor C and moves therewith. The opening 15 in the gear-casing through which the shaft of the motor B passes is made elongated, as clearly shown in Fig. 4, in order to afford a clearance between the inner wall of the casing and the motor-shaft and permit freedom of relative movement of the motor.

Each motor is partially supported upon the truck-frame or vehicle-frame E in any usual manner, as by means of bars 16 and 17, bolted to the respective motors and supported at their ends upon springs 18, carried by the frame E.

In Fig. 3 a somewhat different modification is shown. The motor B' is journaled directly upon the axle, as before, by means of bearings 19 and the arms 20; but the motor C' is simply hung from trunnions 21, which are provided with bearings 22 in the outer ends of the arms 20. In this construction, as in the other, the motors are partially supported upon the truck or vehicle frame, and each is free to swing about said axle independently of the other.

While I have described the present invention with some particularity as embodied in two of its forms, I do not desire to limit the present invention to either of the forms shown and described, except as indicated specifically in some of the claims, since in its broader aspects the present invention may be embodied in various forms.

What I claim as new, and desire to secure by Letters Patent of the United States, is—

1. In combination, a driving-axle, a pair of motors geared thereto, a supporting-bearing upon the axle for one of said motors, and a flexible connection between said motors.

2. In combination, a driving-axle, a pair of motors geared thereto, a supporting-bearing upon the axle for one of said motors, and a hinged connection between said motors.

3. In combination, a driving-axle, a motor having an elongated bearing member journaled upon said axle and a second motor journaled upon said elongated bearing member.

4. In combination, a driving-axle, a pair of motors geared thereto, and means for supporting the motors upon the axle so that each motor may oscillate about said axle independently of the other.

5. In combination, a driving-axle, a motor provided with arms having bearings upon said axle, a second motor pivotally secured to said arms, and gearing between said motors and the driving-axle.

6. In combination, a driving-axle, a gear-wheel secured to said axle, a pair of driving-motors pivotally supported upon said axle so as to be movable independently of each other, and a pinion associated with each motor and meshing with said gear-wheel.

7. In combination, a driving-axle, a gear-wheel secured thereto, a pair of motors pivotally supported upon said axle so as to have independent movements relative thereto, a pinion associated with each of said motors and meshing with said gear-wheels, and a gear-casing carried by one of said motors.

In witness whereof I have hereunto set my hand this 10th day of February, 1905.

EDWARD D. PRIEST.

Witnesses:
BENJAMIN B. HULL,
HELEN ORFORD.